United States Patent
Ma et al.

(10) Patent No.: US 10,313,348 B2
(45) Date of Patent: Jun. 4, 2019

(54) DOCUMENT CLASSIFICATION BY A HYBRID CLASSIFIER

(71) Applicant: Fortinet, Inc., Sunnyvale, CA (US)

(72) Inventors: Ye Ma, Burnaby (CA); Xiping Cao, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 221 days.

(21) Appl. No.: 15/268,977

(22) Filed: Sep. 19, 2016

(65) Prior Publication Data

US 2018/0083970 A1    Mar. 22, 2018

(51) Int. Cl.
*H04L 29/06* (2006.01)
*G06N 7/00* (2006.01)
*G06N 99/00* (2019.01)

(52) U.S. Cl.
CPC ............ *H04L 63/10* (2013.01); *G06N 7/005* (2013.01); *G06N 99/005* (2013.01)

(58) Field of Classification Search
CPC ....... H04L 63/10; G06N 7/005; G06N 99/005
USPC .......................................................... 726/3
See application file for complete search history.

(56) References Cited

U.S. PATENT DOCUMENTS

| | | | | |
|---|---|---|---|---|
| 6,233,575 B1* | 5/2001 | Agrawal | ............. | G06F 17/3071 |
| 6,389,436 B1* | 5/2002 | Chakrabarti | ........ | G06F 17/3071 |
| | | | | 707/999.003 |
| 6,606,620 B1* | 8/2003 | Sundaresan | ......... | G06F 17/3061 |
| 7,464,264 B2* | 12/2008 | Goodman | ............ | G06Q 10/107 |
| | | | | 713/150 |
| 7,979,363 B1* | 7/2011 | Minter | .................... | G06N 7/005 |
| | | | | 706/12 |
| 8,078,625 B1* | 12/2011 | Zhang | ............... | G06F 17/30873 |
| | | | | 707/748 |
| 8,290,203 B1* | 10/2012 | Myers | ................ | G06K 9/00456 |
| | | | | 382/100 |
| 8,505,094 B1* | 8/2013 | Xuewen | .............. | H04L 63/1416 |
| | | | | 707/687 |
| 9,058,490 B1* | 6/2015 | Barker | .................. | G06F 21/564 |
| 9,298,824 B1* | 3/2016 | Vinnik | ............. | G06F 17/30864 |
| 9,442,881 B1* | 9/2016 | Narayan | ................. | G06F 15/16 |
| 9,679,300 B2* | 6/2017 | Lynch | ................ | G06Q 30/0201 |
| 10,057,279 B1* | 8/2018 | Balduzzi | ............. | H04L 63/1416 |
| 2003/0221163 A1* | 11/2003 | Glover | .............. | G06F 17/30707 |
| | | | | 715/205 |
| 2004/0197010 A1* | 10/2004 | Lee | ...................... | G06K 9/3241 |
| | | | | 382/103 |
| 2004/0260677 A1* | 12/2004 | Malpani | ............ | G06F 17/30672 |
| 2005/0071311 A1* | 3/2005 | Agrawal | ........... | G06F 17/30707 |
| 2005/0246307 A1* | 11/2005 | Bala | ....................... | G06N 7/005 |
| | | | | 706/52 |
| 2008/0172412 A1* | 7/2008 | Gruhl | ..................... | G06Q 10/00 |

(Continued)

*Primary Examiner* — Shahriar Zarrineh
(74) *Attorney, Agent, or Firm* — Hamilton, DeSanctis & Cha LLP

(57) ABSTRACT

Systems and methods for classifying URLs by a hybrid classifier are provided. According to one embodiment, a hybrid classifier receives a candidate URL. A naïve Bayes classifier of the hybrid classifier classifies the candidate URL to generate a first classification of the candidate URL and a sublink classifier of the hybrid classifier classifies the candidate URL to generate a second classification of the candidate URL. The hybrid classifier determines a classification of the candidate URL based on the combination of the first and second classification.

16 Claims, 7 Drawing Sheets

(56) References Cited

U.S. PATENT DOCUMENTS

| | | | |
|---|---|---|---|
| 2008/0177681 A1* | 7/2008 | Rosario | G06N 3/126 706/13 |
| 2008/0228675 A1* | 9/2008 | Duffy | G06F 17/278 706/10 |
| 2009/0210407 A1* | 8/2009 | Freire | G06F 17/30864 |
| 2009/0234812 A1* | 9/2009 | Gupta | G06F 17/30864 |
| 2009/0276427 A1* | 11/2009 | Duxbury | G06F 17/277 |
| 2011/0138281 A1* | 6/2011 | Lai | H04L 67/2804 715/716 |
| 2011/0243401 A1* | 10/2011 | Zabair | G06K 9/00 382/128 |
| 2012/0158496 A1* | 6/2012 | Solomon | G06Q 30/0251 705/14.49 |
| 2012/0158626 A1* | 6/2012 | Zhu | G06F 21/56 706/13 |
| 2012/0239506 A1* | 9/2012 | Saunders | G06Q 30/02 705/14.67 |
| 2013/0183951 A1* | 7/2013 | Chien | H04W 4/50 455/418 |
| 2014/0258063 A1* | 9/2014 | Chourasia | G06Q 40/00 705/35 |
| 2014/0258261 A1* | 9/2014 | Singh | G06F 17/3087 707/709 |
| 2014/0324741 A1* | 10/2014 | Stewart | G06N 99/005 706/12 |
| 2015/0033331 A1* | 1/2015 | Stern | H04L 63/1425 726/22 |
| 2015/0278266 A1* | 10/2015 | Tang | G06F 17/3064 707/711 |
| 2015/0356196 A1* | 12/2015 | Sreenivas Prasad | H04L 67/02 707/740 |
| 2016/0012348 A1* | 1/2016 | Johnson | G06N 5/027 706/12 |
| 2016/0070731 A1* | 3/2016 | Chang | G06Q 30/00 707/741 |
| 2016/0188600 A1* | 6/2016 | Owens | G06Q 30/02 707/734 |
| 2016/0294867 A1* | 10/2016 | Tao | G06F 21/55 |
| 2016/0335432 A1* | 11/2016 | Vatamanu | G06F 21/552 |
| 2017/0083825 A1* | 3/2017 | Battersby | G06N 99/005 |
| 2017/0091313 A1* | 3/2017 | Chalabi | G06F 17/30675 |

* cited by examiner

DOCUMENT CLASSIFICATION BY A HYBRID CLASSIFIER

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2016, Fortinet, Inc.

BACKGROUND

Field

Embodiments of the present invention generally relate to the field of network security techniques. In particular, various embodiments relate to classifying documents by hybrid classification engines.

Description of the Related Art

Web pages/sites may belong to different categories such as sports, news, entertainment, business, pornography, hate speech and the like, depending on the content/services being offered. As there are millions of web domains that include different types of content, some of such domains may include desired content, while some other may include content that is undesirable for different types of users. Such undesired web domains therefore are typically classified, and a list of restricted web domains, which may be included in a blacklist, for example, is compiled so as to help network security devices/applications filter or block such traffic and/or inform a network administrator/user about the type of content that the requested web page and/or web domain contains.

Existing security devices/applications generally include a list of websites that need to be blocked depending on network settings and/or the profile of the user who attempts to access the websites. For example, if a child attempts to access a pornographic website, the security device/application may block access to the adult content website to prevent access by the child. Similarly, if someone tries to access similar objectionable content from office premises, such access can be blocked/denied by the security device/application. It is also possible that, for the same web domain, access is allowed for one user (for example, an adult), but not allowed for another user (for example, a child).

Existing security devices/applications also typically maintain a reference table that includes a list of websites that are classified in different categories, and refer to one or more policy rules to decide whether access to a particular website should be allowed to a particular user. Compilation of such a list is a tedious and time consuming task, wherein the network administrator either has to manually provide a list of restricted websites or the security device/application needs to expend valuable computing resources to classify observed websites into different categories to determine whether access to a particular website should be given.

Web page classification, also commonly referred to as web page categorization or web domain classification, is a process of classifying web pages and/or a web domains and/or Uniform Resource Locators (URLs) into different meaningful categories. Prior art solutions provide different classification approaches for classifying a web domain or a web page in different categories based on the content of the web page. A naïve Bayes classifier is a web content classification based on Bayes' theorem with strong independence assumptions between the terms. For example, a term vector for adult website (Category Pornography) can be obtained from a training set of category Pornography. A naïve Bayes classifier can classify web pages/sites that contain enough text content with high accuracy. Bigger training sets and vocabulary can further improve performance of the naïve Bayes classifier. However, for rich media web pages with limited text content and which include mostly images, videos and/or contents that are dynamically generated by script languages, e.g., JavaScript and PHP, the accuracy of a naïve Bayes classifier is not so good.

Therefore, there exists a need for systems and methods for classifying web pages/sites by a hybrid classification engine with a naïve Bayes classifier and a sublink classifier.

SUMMARY

Systems and methods are described for classifying URLs by a hybrid classifier. According to one embodiment, a hybrid classifier receives a candidate URL. A naïve Bayes classifier of the hybrid classifier classifies the candidate URL to generate a first classification of the candidate URL and a sublink classifier of the hybrid classifier classifies the candidate URL to generate a second classification of the candidate URL. The hybrid classifier determines a classification of the candidate URL based on the combination of the first and second classification.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
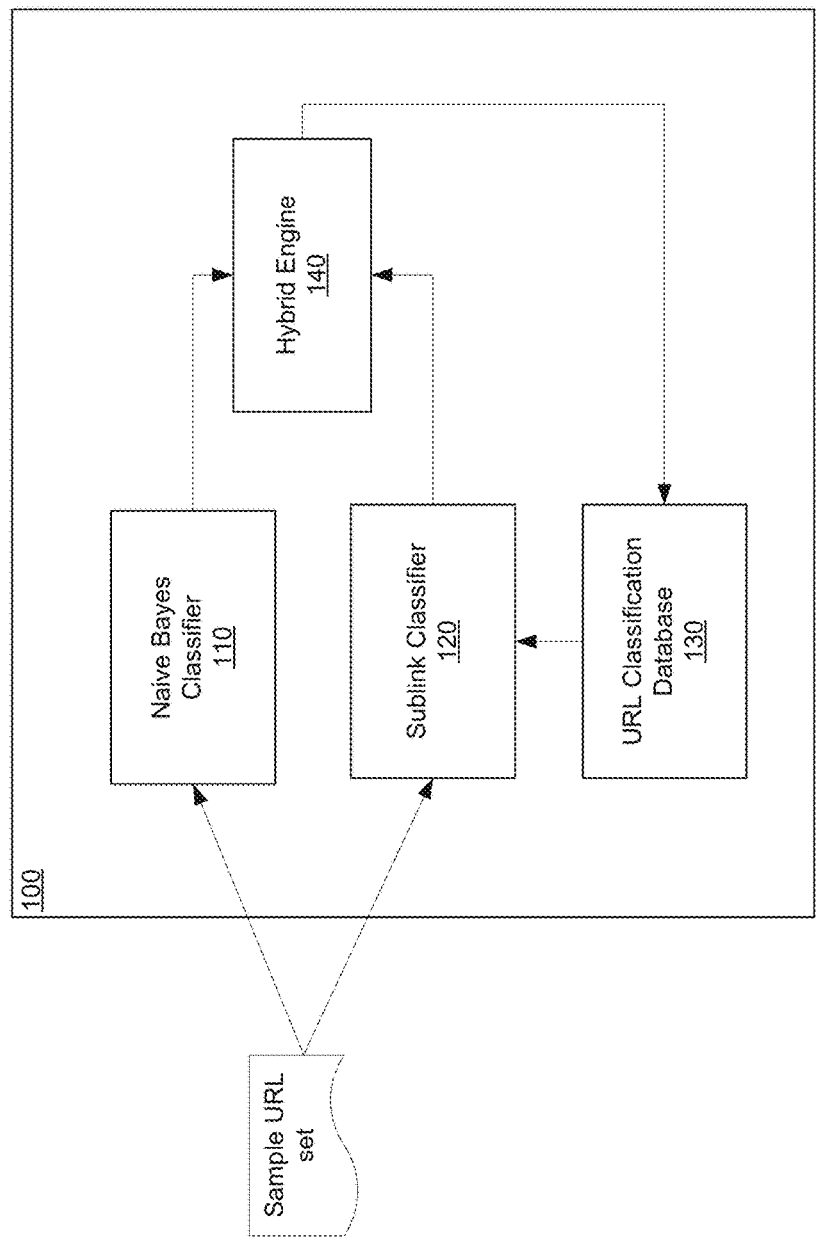
FIG. 1 illustrates an exemplary functional module diagram of a hybrid classification system in accordance with an embodiment of the present invention.

Systems and methods are described for classifying URLs by a hybrid classifier. According to one embodiment, a hybrid classifier receives a candidate URL. A naïve Bayes classifier of the hybrid classifier classifies the candidate URL to generate a first classification of the candidate URL and a sublink classifier of the hybrid classifier classifies the candidate URL to generate a second classification of the candidate URL. The hybrid classifier determines a classification of the candidate URL based on the combination of the first and second classification.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary functional module diagram of a hybrid classification system 100 in accordance with an embodiment of the present invention. Hybrid classification system 100 comprises a naïve Bayes classifier 110, a sublink classifier 120, a URL classification database 130 and hybrid engine 140.

Naïve Bayes classifier 110 is a web page classifier based on Bayes' theorem with strong independence assumptions between the terms. A candidate web page can be classified into one or more classes based on text content of the web page. Classes may be divided into two categories, i.e., a general class and a restricted class. The General class is a class that is suitable for access by any person. The restricted class is a class for which access is restricted, for example, by law, administrators of networks or parents. Before providing access to a web site associated with the restricted class, a network security appliance may provide warning messages about the restriction before users can access the website. The general class may include classes, for example, "news", "education", "sports", "weather", "finance", "entertainment" and etc, while the restricted class may include classes, for example, "pornography", "hate speech", "alcohol", "weapons", "drugs" and the like. In the present example, naïve Bayes classifier 110 is initially trained with training sets that contain a large amount of content that has been previously identified and has a known association with one or more particular classes. Then, each candidate URL of a sample URL set may be classified by naïve Bayes classifier 110 based on the presence of key words of classes within the web page. Example 1 below is a web page that is to be classified by naïve Bayes classifier 110.

EXAMPLE 1

URL:www.xxx.com:
Title: XXX Sex-Free Porn Movies-Porno Videos on XXX.com
Description : XXX Sex and Free Porn Videos on XXX. com
keywordsText: xxx porn, free sex, p*ssy pics, free porn, xxx videos, xxx sex
contentText: XXX Sex-Free Porn Movies-Porno Videos on XXX.com XXX Sex and Free Porn Videos on XXX.com xxx porn, free sex, p*ssy pics, free porn, xxx videos, xxx sex width=device-width, initial-scale=1 xxx sex XXX VIDEOS :: FREE PORN :: HOT SEX PICS http://www.xnxx.com/ xxx http://www.legalporno.com xxx videos http://www.xnxx.com/ XXX Sex on XNXX.com—the #1 porn videos tube in the world!

XNXX is a cloud host for free sex clips. Watch hardcore sex and movies from around the world! Enjoy the hot MILF films, teen lesbians and young (18+) Asian girls on our site. Over 3,900,000 http://www.xnxx.com XXX sex videos and HD porn pics with 10 minute update intervals. http://www.legalporno.com/Legal Porno Videos—Hardcore HD and 3D sex tube. XXX sex videos uploaded by amateurs who send their home made swinger sex clips and hardcore films. So inside you'll find: hot teens f*cking and the best p*ssy pics! Also pornstars, MILF moms and lesbian orgies. Enjoy hardcore f*cking and anal sex on live web cams. XXX.com: Free Porn Movies Hub for full sex videos since 1994
outlinks:http://www.xnxx.com/,
http://www.legalporno.com/

In Example 1, multiple key words of the pornography class exist in the web page. Naïve Bayes classifier 110 therefore classifies this web page as pornography.

Naïve Bayes classifiers are well-known to those skilled in the art and hence further description thereof will be omitted for sake of brevity.

Sublink classifier 120 is a classifier that classifies a candidate web page based on sublinks that are contained in the candidate web page. A sublink is a hyperlink or link that is contained in a web page that directs to another web page. A viewer may jump to a web page directed by a hyperlink from the current web page by selecting the hyperlink. A hyperlink may direct to another network resource other than a web page. A viewer may jump to another application and open the network object to which the hyperlink is directed in the application. Sublink classifier 120 may use a Hypertext Markup Language (HTML) parser or other document parser to retrieve hyperlinks contained in a web page or other documents. If one or more of links contained in the candidate web page are known to belong to a class, the candidate web page is also classified as belonging to the same class as its sublinks. In one example, sublink classifier 120 may search the sublinks in URL classification database 130 and check the classes of sublinks. If one or more classes of sublinks are found from URL classification database 130, the candidate web page is classified as one or more classes of the sublinks by sublink classifier 120. Example 2 below is a web page that is to be classified by sublink classifier 120.

EXAMPLE 2

URL:http://www.widramaje.cf
Source code:
<html><head><title>...Title...</title></head>
<frameset rows="*" frameborder="no" border="0" framespacing="0">
<frame src="https://www.bimarqueege.cf/?u=..." name="mainFrame"></frame>
</frameset>
</html>

In Example 2, the sublink "https://www.bimarqueege.cf/?u=. . . " is found within URL classification database 130 and it is classified as "pornography" by URL classification database 130. Therefore, the candidate web page is also classified as pornography.

Returning to Example 1, the web page of www.xxx.com also contain two sublinks that can be found in URL classification database 130 and are known to be associated with pornography. Therefore, the web page www.xxx.com is also accordingly classified as pornography by sublink classifier 120.

Figure 7:
FIG. 7 is a screen shot of a web page that is classified by a hybrid classification engine in accordance with an embodiment of the present invention.

FIG. 7 shows another example web page that may be classified by naïve Bayes classifier 110 and sublink classifier 120. The web page of FIG. 7 contains text contents having key words associated with the "pornography" class, however, it contains only a few sublinks that direct to social networks. Because the sublinks do not direct to websites associated with pornography, the web page of FIG. 7 is classified within the general class by sublink classifier 120, while it is classified as within the restricted "pornography" class by naïve Bayes classifier 110.

Hybrid engine 140 is used for combining the classification results from naïve Bayes classifier 110 and sublink classifier 120. In one embodiment, this combination provides a more conservative and accurate classification result than either of the classifiers taken alone. According to this conservative approach, when either naïve Bayes classifier 110 or sublink classifier 120 classifies a candidate web page as one of the restricted categories (e.g., pornography), then hybrid engine 140 will classify the candidate web page as being associated with the restricted category. In Example 1 as shown above, the web page contains sufficient key words associated with the pornography class and is therefore classified by naïve Bayes classifier 110 as pornography. The web page also has two pornography sublinks that are known to URL classification database 130. As such, it is also classified as pornography by sublink classifier 120. As the classifications by these two classifiers are the same, hybrid engine 140 classifies the web page of Example 1 as pornography. In Example 2, the web page is not classified as a pornography page by naïve Bayes classifier 110 because it does not contain enough key words associated with the pornography class. However, the web page is classified as a pornography page by sublink classifier 120 because the sublink of the web page are known as pornography links. As one of the two classifiers classifies the web page as a pornography page, hybrid engine 140 classifies it as a pornography page. In Example 3, the web page contains enough key words known to be associated with the pornography class and is classified by naïve Bayes classifier 110 as pornography. The web page does not have any pornography sublinks that are known to URL classification database 130. Therefore, it is not classified as pornography by sublink classifier 120. As one of the two classifiers has classified the web page as a pornography page, hybrid engine 140 classifies it as a pornography page. Hybrid engine 140 may use different strategies to combine the classifications by the two classifiers which will be described further below with reference to FIGS. 4 and 5.

Figure 2:
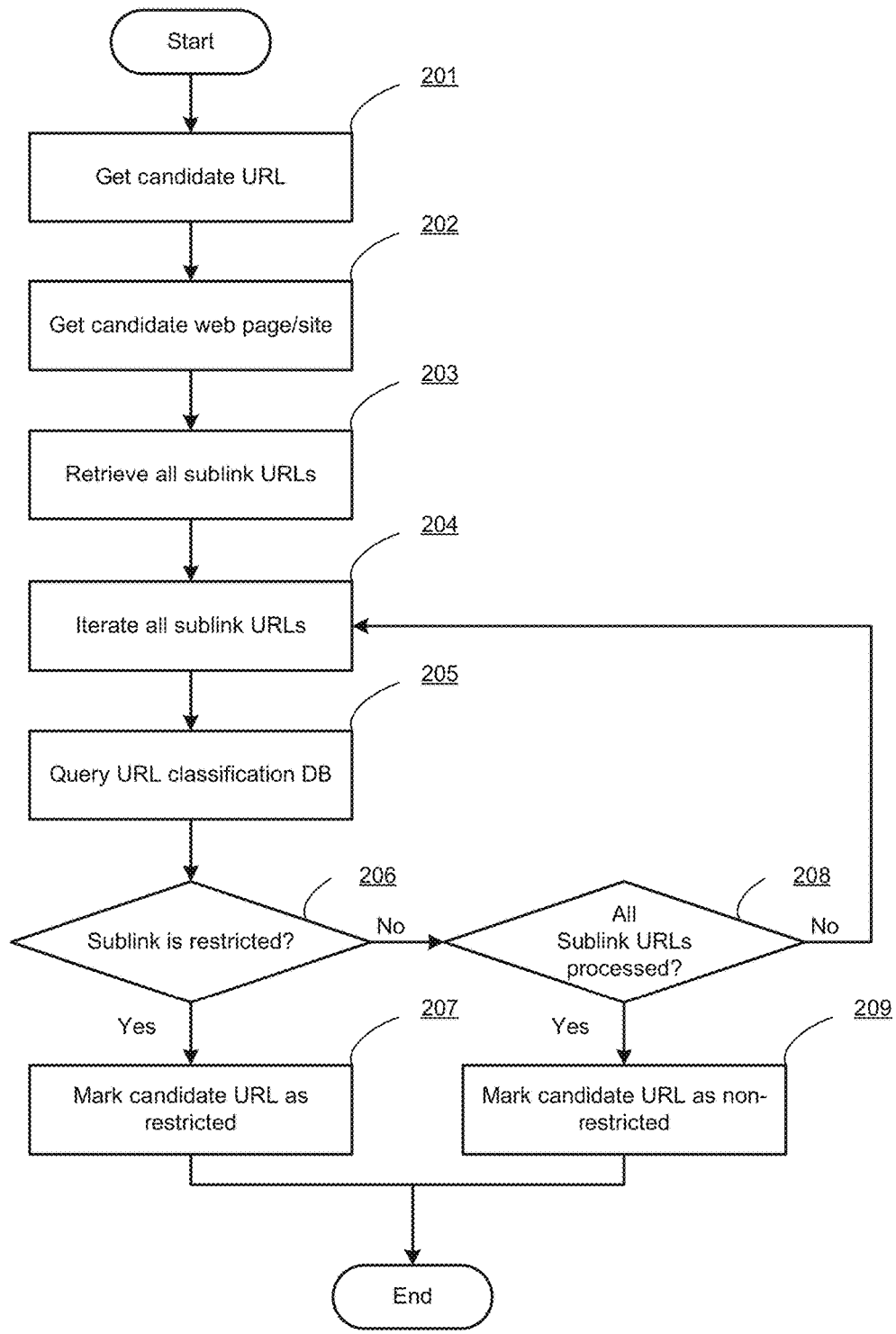
FIG. 2 is a flow diagram illustrating a method for classifying a web page based on outlinks contained in the web page in accordance with an embodiment of the present invention.

FIG. 2 is a flow diagram illustrating a method for classifying a web page based on sublinks contained in the web page in accordance with an embodiment of the present invention. In the present example, a candidate URL is classified based on classes of its sublinks. When one or more of the sublinks of a candidate URL is associated with a restricted class, the candidate URL is classified as the restricted class.

At block 201, a sublink classifier, such as sublink classifier 120 of FIG. 1, receives a candidate URL. In one example, a firewall, such as a FORTIGATE network security appliance available from the assignee of the present invention, which is deployed at a border of a private network may intercept URLs that users of the private network are trying to access in real-time. The firewall may send the intercepted URLs to a local or cloud-based classifier, e.g., a FORTI-GUARD security subscription service web filtering classifier available from the assignee of the present invention, for classification in order to determine if the URLs should be blocked or allowed. Cloud-based classifiers may collect a large amount of candidate URLs across the Internet and provide classification services to subscribers.

At block 202, the sublink classifier may retrieve content associated with the network resource referenced by the candidate URL. If the URL directs to a website, the whole website or part of it may be downloaded for classification. If the URL directs to network resource other than a web page, e.g., a Microsoft Office document, an email, a directory, the content referenced by the URL may be downloaded.

At block 203, the sublink classifier may extract URLs contained in the web page, i.e., sublinks, by parsing the source code of the web page. For documents other than a web page, corresponding parsers can be used by the sublink classifier to extract sublinks from the documents.

At block 204, the sublink classifier iterates over all sublink URLs to classify the sublink URLs. Sublinks may be divided into two categories, i.e., outlinks and innerlinks. An outlink is a sublink that directs to a web site or domain that is different from the present web site or domain. An innerlink is a sublink that directs to a web page within the same website or domain of the present web page. In some examples, all sublinks, including outlinks and innerlinks, of the web page are iterated over for classification. In other examples, only outlinks of the web page are iterated over for classification.

At block 205, sublink classifier may query a URL classification database to check the classification of a sublink. In the present example, the URL classification database is a collection of URLs that have been classified by one or more classifiers. The URL classification database may be maintained by a private network or by a cloud-based classification service provider. URLs may be classified into classes defined by the classifiers and some classes may be further classified as restricted classes that may not be suitable for access by certain people.

At block 206, the sublink classifier determines if a sublink belongs to a restricted class. If so, the candidate URL that contains the sublink is also classified as being associated with the restricted class at block 207. If not, the sublink classifier may check whether all sublinks have been processed at block 208. If any sublinks remain to be evaluated, processing returns to block 204 to check the next sublink.

At block 208, when all sublinks of the candidate URL have been processed and none belong to the restricted class, the candidate URL is classified as a non-restricted class.

Figure 3:
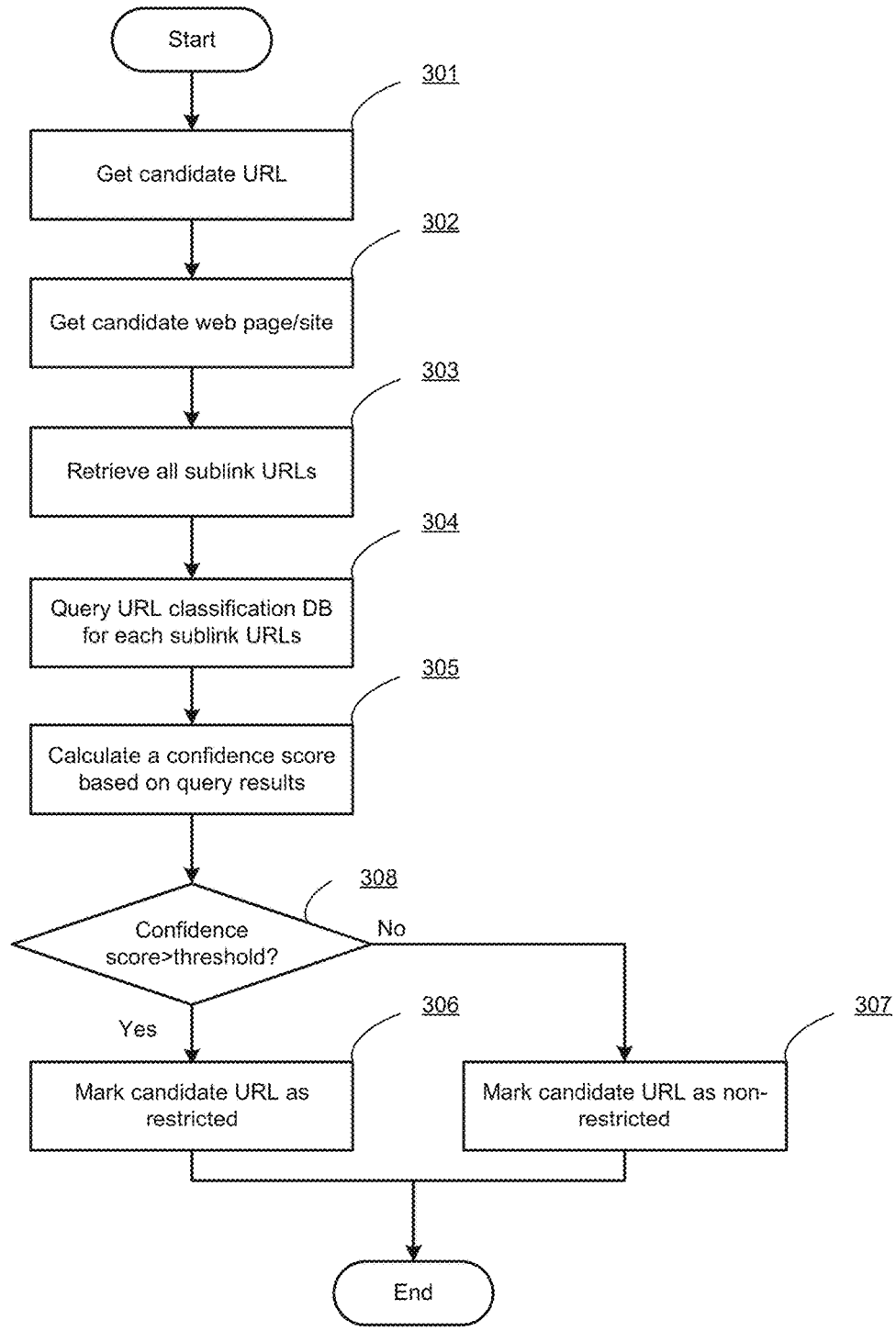
FIG. 3 is a flow diagram illustrating a method for classifying a web page based on outlinks contained in the web page in accordance with another embodiment of the present invention.

FIG. 3 is a flow diagram illustrating a method for classifying a web page based on sublinks contained in the web page in accordance with another embodiment of the present invention. In the present example, a candidate URL is classified by a sublink classifier based on its sublinks and a confidence score indicating the probability of the candidate URL belonging to the same class is also calculated.

The operations of Blocks 301-303 are the same as that of blocks 201-203, therefore further description thereof is omitted.

At block 304, the sublink classifier may iterate over all sublinks of the web page and query a URL classification database for the classes of the sublinks of the web page.

At block 305, the sublink classifier calculates a confidence score of classification of the web page based on the classes of sublinks. In one example, the URL classification database stores classes and confidence scores of known URLs. The classes as well as corresponding confidence scores of sublinks of the web page are retrieved by the sublink classifier. For example, a web page comprises 3 sublinks, such as "a.com/page? . . . ", "b.com/page? . . . ","c**.com/page? . . . " and the URL classification database shows confidence scores of sublinks are as follows:

| URL | Class | Confidence Score |
| --- | --- | --- |
| a**.com/page? . . . | porn | 0.3 |
| b**.com/page? . . . | porn | 0.2 |
| c**.com/page? . . . | porn | 0.1 |

The confidence score of the web page may be derived from the sum of confidence scores for sublinks of the same class. As such, in the context of the above example, the confidence score that the web page is of class "porn" is 0.6 (0.3+0.2+0.1).

In another example, the URL classification database may include the following confidence scores for sublinks of a web page:

| URL | Class | Confidence Score |
| --- | --- | --- |
| a**.com/page? . . . | porn | 0.8 |
| b**.com/page? . . . | porn | 0.1 |
| c**.com/page? . . . | porn | 0.1 |

In an alternative embodiment, the confidence score of the web page may be derived from the highest confidence score of the sublinks associated with the same class. As such, in this example, the confidence score that the web page is of class "porn" is 0.8.

In a further example, the URL classification database may include no confidence scores for sublinks of a web page.

| URL | Class |
| --- | --- |
| a**.com/page? . . . | porn |
| b**.com/page? . . . | porn |
| c**.com/page? . . . | porn |
| d**.com/page? . . . | entertainment |
| e**.com/page? . . . | entertainment |

The confidence score of classification of the web page may be derived from the proportion of restricted sublinks of the web page as compared to non-restricted sublinks. In this example, the confidence score that the web page is of class "porn" would be 0.6 because 60 percent of the sublinks (3 of 5) belong to the class "porn".

Those skilled in the art appreciate that the confidence score of classification of a web page is a way to express the accuracy of the classification of web page and that such a score can be calculated based on a variety of other factors and combinations of classifications of sublinks.

At block 308, the sublink classifier may determine whether the confidence score that the web page is of a restricted class is higher than a predetermined threshold. If so, the web page is classified as the restricted class at block 306. Otherwise, the web page is classified as non-restricted class at block 307. Those skilled in the art appreciate that classification conducted by a classifier is not 100 percent correct because an algorithm used by a classifier may not be suitable for every type of content. Further, a web page may contain different kinds of content, such as restricted content and other content mixed within the same page. Such mixed content make it difficult for a classifier as well as to a human operator to determine whether the web page should be classified within a restricted class or not. The threshold for the confidence score may be introduced to adjust the classification result. For example, classification by a cloud-based classification service provider may be used widely by subscribers across the Internet. An incorrect classification of a web page may result in complaints by the owner of the web page. Therefore, a threshold for a restricted class may be adjusted to be higher by the cloud-based classification service provider in order that a web page is classified as a restricted class only when the web page contains a sufficient amount of restricted content. For private network administrators or parents, the threshold of the restricted class may be set to a lower value and the classifier may be sensitive to restricted content.

Figure 4:
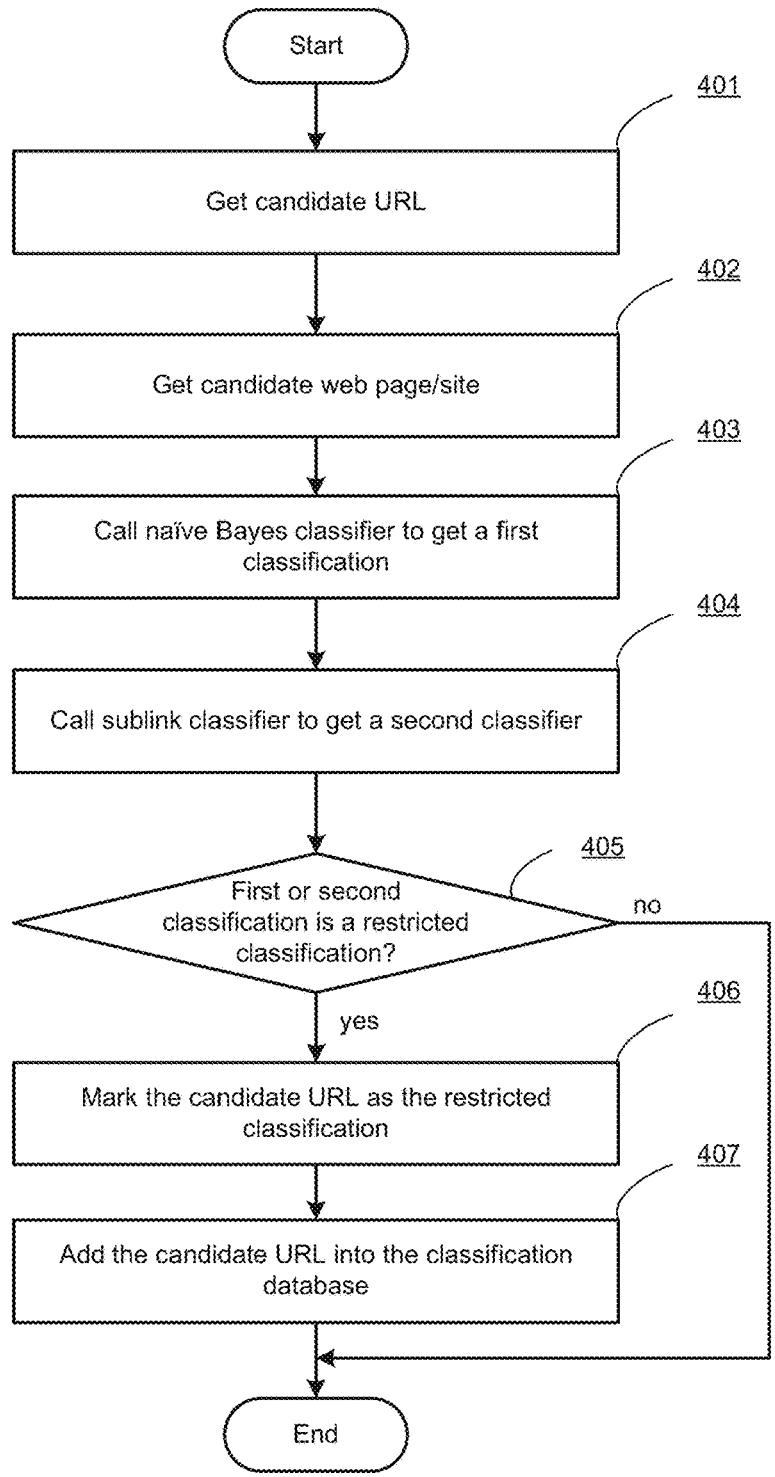
FIG. 4 is a flow diagram illustrating a method for classifying a web page based on a hybrid classifier in accordance with an embodiment of the present invention.

FIG. 4 is a flow diagram illustrating a method for classifying a web page based on a hybrid classifier in accordance with an embodiment of the present invention. In the present example, classification results of a web page from a naïve Bayes classifier and a sublink classifier are combined to determine the classification of the web page.

At block 401, a hybrid classification system receives a candidate URL.

At block 402, the hybrid classification system may retrieve the web page referenced by the candidate URL.

At block 403, the hybrid classification system calls a naïve Bayes classifier to classify the candidate URL and receives a first classification from the naïve Bayes classifier. The process of calling a naïve Bayes classifier to classify a candidate URL is well known to those skilled in the art.

At block 404, the hybrid classification system calls a sublink classifier to classify the candidate URL and receives a second classification of the candidate URL. The process of calling a sublink classifier to classify the candidate URL was described above with reference to FIGS. 2 and 3.

At block 405, the hybrid classification system checks if either the first or the second classification resulted in a restricted class.

At block 406, the candidate URL is classified as a restricted class if one or more of the first and the second classification resulted in a restricted class. In this example, the naïve Bayes classifier is a text based classifier that is suitable for web pages that have text content with enough classified key words. For web pages that lack of text content but instead have rich media links or sublinks or outlinks, the classification of the naïve Bayes classifier may not be reliable. However, the sublink classifier classifies web pages based on the links contained in the web pages. As such, the naïve Bayes classifier and the sublink classifier may be complementary to each other with one filling gaps of the other.

At block 407, the candidate URL is added to a URL classification database used by the sublink classifier in order that the candidate URL can be used to determine the classification of other URLs that refer to the candidate URL.

Figure 5:
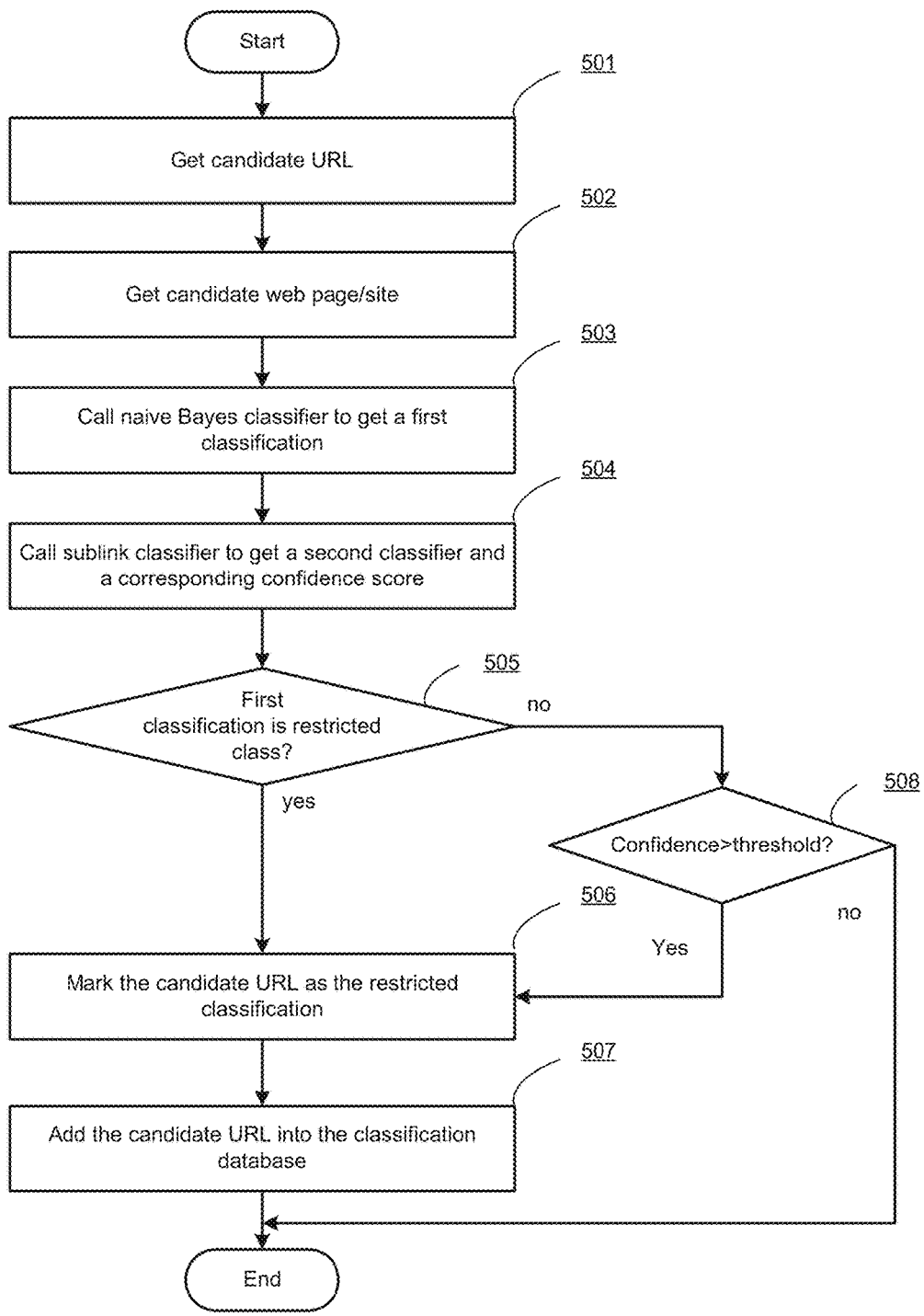
FIG. 5 is a flow diagram illustrating a method for classifying a web page based on a hybrid classifier in accordance with another embodiment of the present invention.

FIG. 5 is a flow diagram illustrating a method for classifying a web page based on a hybrid classifier in accordance with another embodiment of the present invention. In this example, classification result of a web page is based on the classification of a naïve Bayes classifier with a complementary sublink classifier.

At block 501, a hybrid classification system receives a candidate URL.

At block 502, the hybrid classification system may retrieve the web page referenced by the candidate URL.

At block 503, the hybrid classification system calls a naïve Bayes classifier to classify the candidate URL and receives a first classification from the naïve Bayes classifier.

At block 504, the hybrid classification system calls a sublink classifier to classify the candidate URL and receives a second classification of the candidate URL and a corresponding confidence score. The process of calling a sublink classifier to classify the candidate URL and calculate a confidence score was described above with reference to FIG. 3.

At block 505, the hybrid classification system checks if the first classification from the naïve Bayes classifier is a restricted class.

At block 506, the candidate URL is classified as a restricted class by the hybrid classification system if the first classification from the naïve Bayes classifier is a restricted class.

At block 507, the candidate URL is added to a URL classification database used by the sublink classifier in order that the candidate URL can be used to determine the classification of other URLs that refer to the candidate URL.

At block 508, when the first classification from the naïve Bayes classifier is not a restricted class, the hybrid classification system further checks if the confidence score given by the sublink classifier is higher than a predetermined threshold. When the confidence score is higher than the threshold, it means that the sublink classifier found sufficient restricted links in the candidate web page to classify the candidate web page as being associated with a restricted class. Therefore, the hybrid classification system classifies the candidate URL as a restricted class despite the fact that the naïve Bayes classifier was unable to classify the candidate URL correctly.

In the above examples, the hybrid classification system combines classifications from a naïve Bayes classifier and a sublink classifier. In other embodiments of the present invention, a hybrid classification system may include a classifier that classifies web pages based on text contents of the web pages and a sublink classifier. As the text based classifier and the sublink based classifier are complementary to each other in classifying URLs, a hybrid classification system utilizing a combination of these two types of classifiers may be applicable to more web pages than either of the classifiers individually and may provide more accurate classification for these web pages than either of the classifiers individually.

Figure 6:
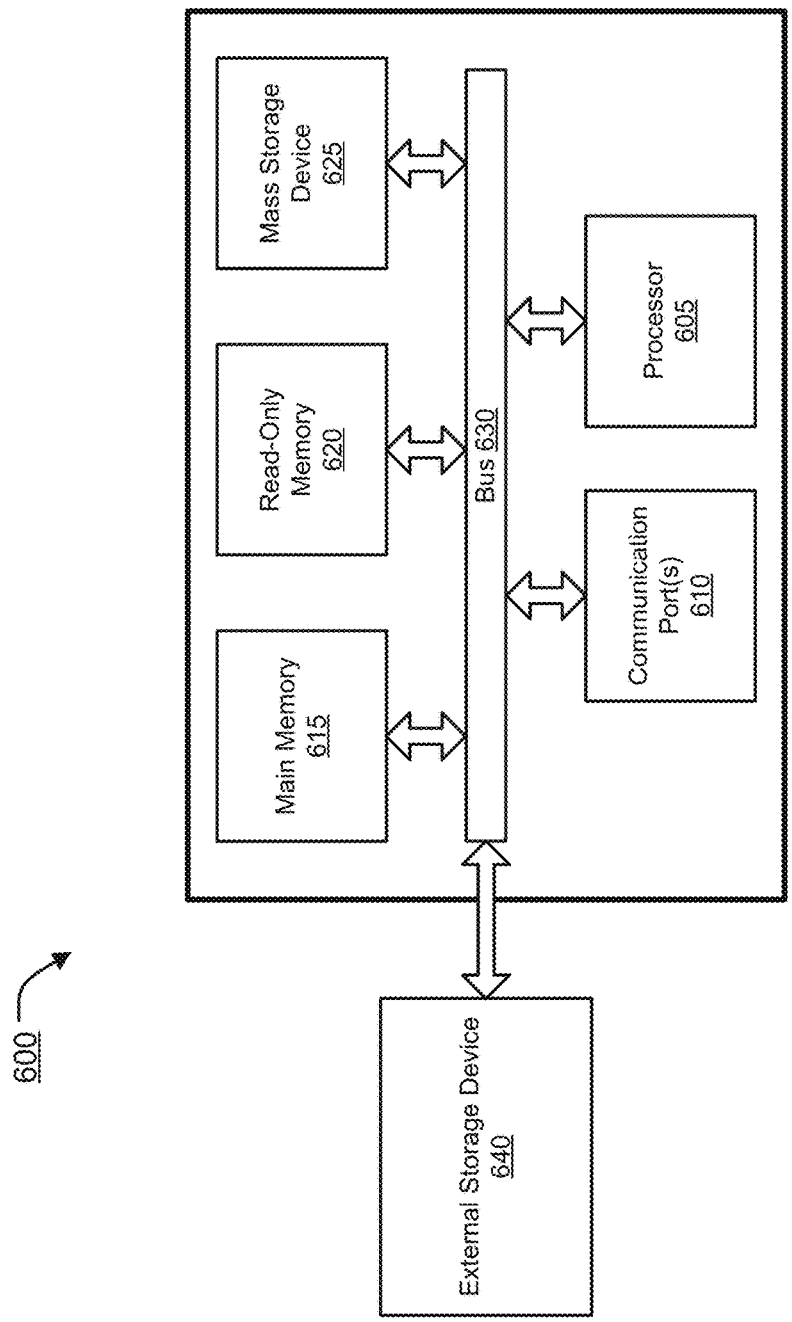
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of a local or remote network appliance implementing a hybrid classification system (e.g., hybrid classification system 100), a server of a cloud-based security subscription service implementing a hybrid classification system (e.g., hybrid classification system 100) or a client workstation.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:

receiving from a network security device protecting a private network, by a hybrid classification engine, a candidate uniform resource locator (URL) intercepted by the network security device as part of an attempt to access a network resource by a user of the private network and that is to be classified by the hybrid classification engine, wherein the hybrid classification engine comprises a naïve Bayes classifier and a sublink classifier;

facilitating, by the hybrid classification engine, handling of the attempt to access the network resource by the network security device by performing a real-time classification of the candidate URL as being associated with one or more of a plurality of classes of content based on a combination of text content of the network resource and a plurality of sublinks contained within the network resource, including:

generating a first classification for the candidate URL by classifying, by the naïve Bayes classifier, the candidate URL based on the text content and previous training of the naïve Bayes classifier on text content having a known association with the one or more of the plurality of classes of content;

generating a second classification for the candidate URL by classifying, by the sublink classifier, the candidate URL, wherein the second classification is determined based on at least one sublink of the plurality of sublinks, by:

retrieving the network resource referenced by the candidate URL;

identifying the at least one sublink within the network resource;

determining a classification of the at least one sublink by searching a URL classification database; and determining the second classification of the candidate URL based on the classification of the at least one sublink; and determining, by the hybrid classification engine, a final classification of the candidate URL by combining the first classification and the second classification, including:

when the first classification is not within a plurality of restricted classes, determining whether a confidence score for the second classification is greater than a predetermined threshold indicative of a sufficient number of the plurality of sublinks being associated with a restricted class of the plurality of restricted classes; and responsive to determining the confidence score is greater than the predetermined threshold, setting the final classification to the restricted class, whereby the hybrid classification engine is able to classify the candidate URL as being associated with the restricted class despite an inability on a part of the naïve Bayes classifier to classify the candidate URL as being associated with the restricted class; and causing, by the hybrid classification engine, the network security device to block or allow the attempt to access the network resource based on the final classification.

2. The method of claim 1, further comprising determining, by the hybrid classification engine, the candidate URL is a restricted URL when either the first classification or the second classification is indicative of the candidate URL being associated with one of the plurality of restricted classes.

3. The method of claim 2, further comprising calculating, by the sublink classifier, the confidence score for the second classification based on the classification of the at least one sublink, wherein the confidence score is indicative of a probability that the candidate URL belongs to the second classification.

4. The method of claim 1, further comprising when the confidence score is less than the predetermined threshold, then concluding, by the hybrid classification engine, the candidate URL does not belong to the restricted class.

5. The method of claim 1, further comprising incorporating, by the hybrid classification engine, the classification within the URL classification database.

6. The method of claim 1, wherein the at least one sublink is an outlink that directs to a domain different from that of the candidate URL.

7. A computer system comprising:

non-transitory storage device having embodied therein instructions representing a hybrid classifier; and one or more processors coupled to the non-transitory storage device and operable to execute the hybrid classifier to perform a method comprising:

receiving, from a network security device protecting a private network, a candidate uniform resource locator (URL) intercepted by the network security device as part of an attempt to access a network resource by a user of the private network and that is to be classified by the hybrid classifier, wherein the hybrid classifier implements a naïve Bayes classifier and a sublink classifier;

facilitating handling of the access request by the network security device by performing a real-time classification of the candidate URL as being associated with one or more of a plurality of classes of content based on a combination of text content of the network resource and a plurality of sublinks contained within the network resource, including:

generating a first classification for the candidate URL by classifying, by the naïve Bayes classifier, the candidate URL based on the text content and previous training of the naïve Bayes classifier on text content having a known association with the one or more of the plurality of classes of content;

generating a second classification for the candidate URL by classifying, by the sublink classifier, the candidate URL, wherein the second classification is determined based on at least one sublink of the plurality of sublinks by:

retrieving the network resource referenced by the candidate URL;

identifying the at least one sublink within the network resource;

determining a classification of the at least one sublink by searching a URL classification database; and determining the second classification of the candidate URL based on the classification of the at least one sublink; and determining a final classification of the candidate URL by combining the first classification and the second classification, including:

when the first classification is not within a plurality of restricted classes, determining whether a confidence score for the second classification is greater than a predetermined threshold indicative of a sufficient number of the plurality of sublinks being associated with a restricted class of the plurality of restricted classes; and responsive to determining the confidence score is greater than the predetermined threshold, setting the final classification to the restricted class, whereby the hybrid classifier is able to classify the candidate URL as being associated with the restricted class despite an inability on a part of the naïve Bayes classifier to classify the candidate URL as being associated with the restricted class; and causing the network security device to block or allow the access request based on the final classification.

8. The computer system of claim 7, wherein the method further comprises determining the candidate URL is a restricted URL when either the first classification or the second classification is indicative of the candidate URL being associated with one of the plurality of restricted classes.

9. The computer system of claim 8, wherein the method further comprises calculating, by the sublink classifier, the confidence score for the second classification based on the classification of the at least one sublink, wherein the confidence score is indicative of a probability that the candidate URL belongs to the second classification.

10. The computer system of claim 7, wherein the method further comprises when the confidence score is less than the predetermined threshold, then concluding the candidate URL does not belong to the restricted class.

11. The computer system of claim 7, wherein the method further comprises incorporating the classification within the URL classification database.

12. The computer system of claim 7, wherein the at least one sublink is an outlink that directs to a domain different from that of the candidate URL.

13. The method of claim 1, wherein the hybrid classification engine is running on a local computer system within the private network.

14. The method of claim 1, wherein the hybrid classification engine is running on a computer system associated with a cloud-based security subscription service.

15. The computer system of claim 7, wherein the computer system is within the private network.

16. The computer system of claim 7, wherein the computer system is associated with a cloud-based security subscription service.

* * * * *